(12) United States Patent
Nakamura et al.

(10) Patent No.: US 11,821,507 B2
(45) Date of Patent: Nov. 21, 2023

(54) METHOD OF MANUFACTURING SPEED REDUCER, SPEED REDUCER, AND ROTATING DEVICE

(71) Applicant: Nabtesco Corporation, Tokyo (JP)

(72) Inventors: Koji Nakamura, Tokyo (JP); Shinji Inoue, Tokyo (JP)

(73) Assignee: Nabtesco Corporation, Tokyo (JP)

( * ) Notice: Subject to any disclaimer, the term of this patent is extended or adjusted under 35 U.S.C. 154(b) by 0 days.

(21) Appl. No.: 18/186,463

(22) Filed: Mar. 20, 2023

(65) Prior Publication Data

US 2023/0341041 A1 Oct. 26, 2023

(30) Foreign Application Priority Data

Apr. 21, 2022 (JP) ................................. 2022-070237

(51) Int. Cl.
| | |
|---|---|
| F16H 57/021 | (2012.01) |
| F16C 3/035 | (2006.01) |
| F16H 57/023 | (2012.01) |
| F16C 35/063 | (2006.01) |
| B25J 9/10 | (2006.01) |

(52) U.S. Cl.
CPC .......... F16H 57/021 (2013.01); F16C 3/035 (2013.01); F16C 35/063 (2013.01); F16H 57/023 (2013.01); *B25J 9/102* (2013.01); *F16C 2380/26* (2013.01)

(58) Field of Classification Search
CPC .. F16H 57/021; F16H 57/023; F16C 2380/26; B25J 9/102
See application file for complete search history.

(56) References Cited

FOREIGN PATENT DOCUMENTS

| CN | 103394884 A | 11/2013 | |
|---|---|---|---|
| DE | 102019203058 A1 | 9/2019 | |
| EP | 0551918 A2 | 7/1993 | |
| JP | 2017048889 A * | 3/2017 | ............... F16H 1/32 |
| JP | 2021-095964 A | 6/2021 | |

OTHER PUBLICATIONS

Extended European Search Report dated Sep. 5, 2023, issued in corresponding European Patent Application No. 23162863.7 (10 pgs.).

* cited by examiner

*Primary Examiner* — Randell J Krug
(74) *Attorney, Agent, or Firm* — Pillsbury Winthrop Shaw Pittman, LLP

(57) ABSTRACT

The present disclosure relates to a manufacturing method of a speed reducer. The speed reducer includes an outer tube, a shaft portion, an input shaft, a first bearing, a speed reducing portion, and an attachment member. The shaft portion has a first receiving surface and a shaft end surface. The outer tube has a second receiving surface. The first bearing has a first inner ring and a first outer ring. The first receiving surface contacts the first inner ring. The second receiving surface contacts the first outer ring. A first machining accuracy is obtained based on a first parallelism between the first receiving surface and the shaft end surface. A second machining accuracy is obtained based on a second parallelism between the second receiving surface and the flange mounting surface. The manufacturing method includes performing machining such that the first machining accuracy becomes higher than the second machining accuracy.

9 Claims, 4 Drawing Sheets

METHOD OF MANUFACTURING SPEED REDUCER, SPEED REDUCER, AND ROTATING DEVICE

CROSS-REFERENCE TO RELATED APPLICATIONS

This application is based on and claims the benefit of priority from Japanese Patent Application Serial No. 2022-070237 (filed on Apr. 21, 2022), the contents of which are hereby incorporated by reference in its entirety.

TECHNICAL FIELD

The present disclosure relates to a method of manufacturing a speed reducer, a speed reducer, and a rotating device.

BACKGROUND

Industrial robots and machine tools typically include a motor unit provided at a connection portion (joint) between a pair of arms, which are rotatably coupled to each other, to drive the arms. The motor unit includes a motor and a speed reducer coupled with the motor. A motor torque generated by rotation of the motor is reduced by the reducer and then outputted to the arm (see, for example, Japanese Patent Application Publication No. 2021-95964).

To keep high precision in terms of runout of an output rotating shaft end in the speed reducer for the industrial robots described above, it was necessary to fabricate parts constituting the industrial robots with a high dimension accuracy and assemble the parts with a high assembling accuracy. This resulted in a high price of finished products, and there was room for improvement in this respect.

SUMMARY

The present disclosure provides a method of manufacturing a speed reducer with which a high-precision speed reducer can be manufactured with simple adjustment work in the manufacturing process and which can reduce the manufacturing costs. The disclosure also provides a speed reducer, and a rotating device thereof.

According to one aspect of the disclosure, provided is a manufacturing method of a speed reducer. The speed reducer includes: an outer tube; a shaft portion rotatably provided inside the outer tube, the shaft portion being fixedly coupled to an output shaft and having a shaft end surface; an input shaft coupled to a drive source; a pair of bearings rotatably supporting the outer tube relative to the shaft portion, the pair of bearings including a first bearing provided near the shaft end surface and a second bearing different from the first bearing; a speed reducing portion connected with the input shaft and rotatably supporting the shaft portion; and an attachment member having a flange, the flange having a flange mounting surface fastened to the outer tube by a bolt, the flange extending perpendicular to a rotational axis of the shaft portion and being attachable to the drive source. The shaft portion has a first receiving surface. The outer tube has a second receiving surface. The first bearing has a first inner ring and a first outer ring. The first receiving surface contacts the first inner ring in a direction of the rotational axis. The second receiving surface contacts the first outer ring in the rotational axis direction. A first machining accuracy is obtained based on a first parallelism between the first receiving surface and the shaft end surface. A second machining accuracy is obtained based on a second parallelism between the second receiving surface and the flange mounting surface. The manufacturing method includes performing machining such that the first machining accuracy is higher than the second machining accuracy.

In this configuration, only the first machining accuracy based on the first parallelism between the first receiving surface of the shaft portion and the shaft end surface of the shaft portion can be adjusted at the final step of the manufacturing process of the speed reducer. By adjusting the first machining accuracy, it is possible to produce the speed reducer that can minimize the runout of the shaft portion, i.e., the runout of the output shaft. Thus, according to the aspect, the speed reducer with high accuracy can be manufactured by the simple adjustment work in the manufacturing process. Therefore, the manufacturing cost can be reduced. In other words, it is possible to manufacture precision reducers (RVs) for which runout adjustment is unnecessary or can be minimized.

In the above manufacturing method of the speed reducer, machining may be performed such that the first parallelism of the first machining accuracy becomes 10 μm or less, regardless of a rotation phase between the shaft portion and the outer tube.

In the above manufacturing method of the speed reducer, the axial runout of the pair of bearings may be equal to or less than 90 μm.

In the above manufacturing method of the speed reducer, the outer tube may have a flange mounted surface. The flange mounting surface may be coupled to the flange mounted surface. Machining may be performed such that a third parallelism between the flange mounting surface and the flange mounted surface becomes 20 μm or less.

In the above manufacturing method of the speed reducer, the second bearing may have a second inner ring and a second outer ring. The outer tube may have a third receiving surface and a flange mounted surface. The third receiving surface may contact the second outer ring in the rotational axis direction. The flange mounting surface may be coupled to the flange mounted surface. Machining may be performed such that a parallelism between each of the second receiving surface, the third receiving surface, and the flange mounted surface becomes 30 μm or less.

In the above manufacturing method of the speed reducer, machining may be performed such that the second parallelism of the second machining accuracy becomes 170 μm or less.

According to another aspect of the disclosure, provided is a manufacturing method of a speed reducer. The speed reducer includes: an outer tube; a shaft portion rotatably provided inside the outer tube, the shaft portion being fixedly coupled to an output shaft and having a shaft end surface; an input shaft coupled to a drive source; a pair of bearings rotatably supporting the outer tube relative to the shaft portion, the pair of bearings including a first bearing provided near the shaft end surface and a second bearing different from the first bearing; a speed reducing portion connected with the input shaft and rotatably supporting the shaft portion; and an attachment member having a flange, the flange having a flange mounting surface fastened to the outer tube by a bolt, the flange extending perpendicular to a rotational axis of the shaft portion and attachable to the drive source. The axial runout of the pair of bearings is equal to or less than 90 μm. The shaft portion has a first receiving surface. The outer tube has a second receiving surface. The first bearing has a first inner ring and a first outer ring. The first receiving surface contacts the first inner ring in a direction of the rotational axis. The second receiving surface contacts the first outer ring in the rotational axis direction. A first machining accuracy is obtained based on a first parallelism between the first receiving surface and the shaft end surface. A second machining accuracy is obtained based on a second parallelism between the second receiving surface and the flange mounting surface. The outer tube has a third receiving surface and a flange mounted surface. The flange mounting surface is coupled to the flange mounted surface. The second bearing has a second inner ring and a second outer ring. The third receiving surface contacts the second outer ring in the rotational axis direction. The manufacturing method includes performing machining such that the first machining accuracy becomes higher than the second machining accuracy. Further, machining is performed such that the first parallelism of the first machining accuracy becomes 10 µm or less, regardless of a rotation phase between the shaft portion and the outer tube. Further, machining is performed such that a third parallelism between the flange mounting surface and the flange mounted surface becomes 20 µm or less. Further, machining is performed such that a parallelism between each of the second receiving surface, the third receiving surface, and the flange mounted surface is 30 µm or less.

In this configuration, only the first machining accuracy based on the first parallelism between the first receiving surface of the shaft portion and the shaft end surface of the shaft portion can be adjusted at the final step of the manufacturing process of the speed reducer. By adjusting the first machining accuracy, it is possible to produce the speed reducer that can minimize the runout of the shaft portion, i.e., the runout of the output shaft. Thus, according to the aspect, the speed reducer with high accuracy can be manufactured by the simple adjustment work in the manufacturing process. Therefore, the manufacturing cost can be reduced. In other words, it is possible to manufacture precision reducers (RVs) for which runout adjustment is unnecessary or can be minimized.

A speed reducer according to yet another aspect of the disclosure includes: an outer tube; a shaft portion rotatably provided inside the outer tube, the shaft portion being fixedly coupled to an output shaft and having a shaft end surface; an input shaft provided in a drive source; a pair of bearings rotatably supporting the outer tube relative to the shaft portion, the pair of bearings including a first bearing provided near the shaft end surface and a second bearing different from the first bearing; a speed reducing portion connected with the input shaft and rotatably supporting the shaft portion; and an attachment member having a flange, the flange having a flange mounting surface fastened to the outer tube by a bolt, the flange extending perpendicular to a rotational axis of the shaft portion and being attachable to the drive source. The shaft portion has a first receiving surface. The outer tube has a second receiving surface. The first bearing has a first inner ring and a first outer ring. The first receiving surface contacts the first inner ring in a direction of the rotational axis. The second receiving surface contacts the first outer ring in the rotational axis direction. A first machining accuracy is obtained based on a first parallelism between the first receiving surface and the shaft end surface. A second machining accuracy is obtained based on a second parallelism between the second receiving surface and the flange mounting surface. The first machining accuracy is higher than the second machining accuracy.

In this configuration, only the first machining accuracy based on the first parallelism between the first receiving surface of the shaft portion and the shaft end surface of the shaft portion can be adjusted at the final step of the manufacturing process of the speed reducer. By adjusting the first machining accuracy, it is possible to produce the speed reducer that can minimize the runout of the shaft portion, i.e., the runout of the output shaft. Thus, according to the aspect, the speed reducer with high accuracy can be manufactured by the simple adjustment work in the manufacturing process. Therefore, the manufacturing cost can be reduced. In other words, it is possible to manufacture precision reducers (RVs) for which runout adjustment is unnecessary or can be minimized.

According to still yet another aspect of the disclosure provides a rotating device that includes a device body, a rotated body with a working head, an electric motor provided on the device body, where the electric motor is configured to produce a driving force to rotate the rotated body, and a speed reducer for reducing speed of rotation of the electric motor. The speed reducer includes: an outer tube; a shaft portion rotatably provided inside the outer tube, the shaft portion being fixedly coupled to an output shaft and having a shaft end surface; an input shaft coupled to a drive source; a pair of bearings rotatably supporting the outer tube relative to the shaft portion, the pair of bearings including a first bearing provided near the shaft end surface and a second bearing different from the first bearing; a speed reducing portion connected with the input shaft and rotatably supporting the shaft portion; and an attachment member having a flange, the flange having a flange mounting surface fastened to the outer tube by a bolt, the flange extending perpendicular to a rotational axis of the shaft portion and being attachable to the drive source. The shaft portion has a first receiving surface. The outer tube has a second receiving surface. The first bearing has a first inner ring and a first outer ring. The first receiving surface contacts the first inner ring in a direction of the rotational axis. The second receiving surface contacts the first outer ring in the rotational axis direction. A first machining accuracy is obtained based on a first parallelism between the first receiving surface and the shaft end surface. A second machining accuracy is obtained based on a second parallelism between the second receiving surface and the flange mounting surface. The first machining accuracy is higher than the second machining accuracy.

In this configuration, only the first machining accuracy based on the first parallelism between the first receiving surface of the shaft portion and the shaft end surface of the shaft portion can be adjusted at the final step of the manufacturing process of the speed reducer. By adjusting the first machining accuracy, it is possible to produce the speed reducer that can minimize the runout of the shaft portion, i.e., the runout of the output shaft. This speed reducer can be provided in the rotating device. According to this aspect, the speed reducer with high accuracy can be manufactured by the simple adjustment work in the manufacturing process. Therefore, the manufacturing cost can be reduced. In other words, it is possible to manufacture precision reducers (RVs) for which runout adjustment is unnecessary or can be minimized.

Advantageous Effects

With the manufacturing method of a speed reducer, the speed reducer, and the rotating device above, it is possible to manufacture a speed reducer with high accuracy by the simple adjustment work in the manufacturing process. Therefore, the manufacturing cost can be reduced.

DESCRIPTION OF THE EMBODIMENTS

The embodiments of the present invention will be hereinafter described with reference to the drawings. In the following embodiments and modifications, like elements will be denoted by the same reference signs and redundant descriptions will be partly omitted.

Figure 1:
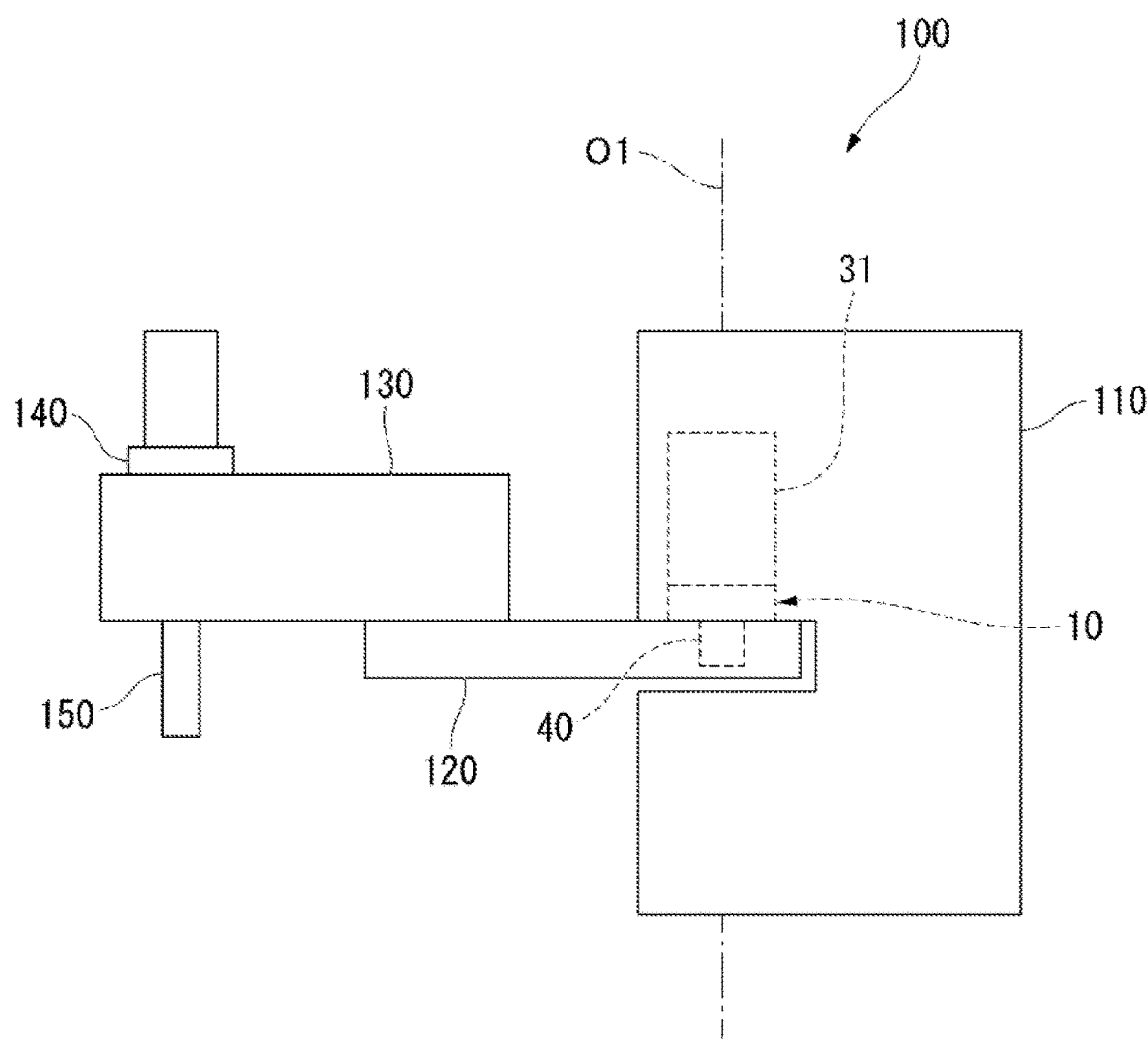
FIG. 1 is a side view of an industrial robot including a speed reducer relating to an embodiment.

FIG. 1 is a side view of an industrial robot 100 including a speed reducer 10 used for a motor with the speed reducer in a drive unit. The industrial robot 100 (rotating device) relating to the embodiment is an industrial robot used, for example, for feeding, shipping, transporting, and assembling parts of precision equipment and the like. The industrial robot 100 has a base 110 (device body), a first arm 120 (rotated body), a second arm 130 (rotated body), a work head 140, and an end-effector 150.

Figure 2:
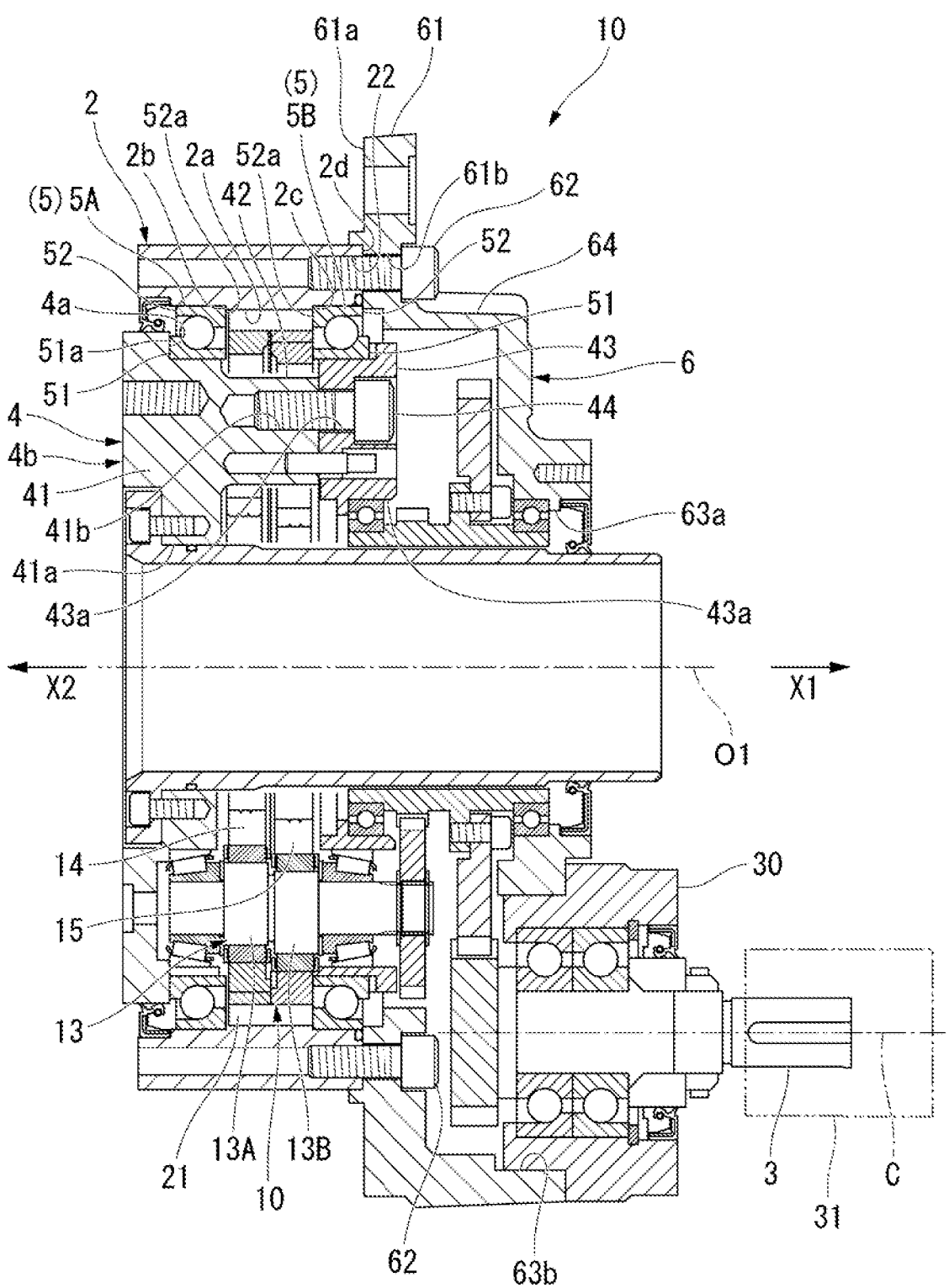
FIG. 2 is a schematic side view of the speed reducer related to the embodiment.

The first arm 120, which is rotatable around an axis O1, is coupled with the base 110. The first arm 130, which is rotatable around an axis parallel to the axis O1, is coupled with the second arm 120. The work head 140 is provided at the front end of the second arm 130 and coupled with the end-effector 150. The base 110 has therein an electric motor 31 such as a servomotor, and the speed reducer 10 for reducing the speed of rotations of the electric motor 31. The first arm 120 is rotatable when acted upon by a driving force form the electric motor 31. As shown in FIG. 2, an input shaft 3 (described below) of the speed reducer 10 is coupled with a rotational shaft (motor shaft 20) of the electric motor 31. An output shaft 40 of the speed reducer 10 is coupled with the first arm 120. When the driving force from the motor 31 is transmitted to the first arm 120 through the speed reducer 10, the first arm 120 rotates within a horizontal plane around the axis O1.

As shown in FIG. 1, the speed reducer 10 is provided in the industrial robot 100 at a connecting portion (joint portion) of the first arm 120 rotatably coupled thereto. The speed reducer 10 reduces a motor torque inputted thereto from the electric motor 31 serving as a power source with a predetermined reduction ratio and outputs the reduced torque to the output shaft 40. In other words, the speed reducer 10 is configured to change the number of rotations at a predetermined ratio and transmit a resulting driving force between the drive source and a mechanical part such as the arm.

In the description of the embodiment, the direction extending along the axis O1 of the electric motor 31 of the speed reducer 10 is simply referred to as an axial direction (rotational axis direction). The direction intersecting the axis O1 when viewed in the axial direction is hereunder referred to as a radial direction. The direction extending around the axis O1 is referred to as a circumferential direction. The inwardly facing side of an object is hereunder referred to an axially inner side. The side opposite to the axially inner side is hereunder referred to as an axially outer side. Furthermore, the side of the speed reducer 10 connected to the drive source is referred to as input side X1. The side of the speed reducer 10 connected to a mechanical part such as the arm described above receiving the output from the speed reducer 10 is referred to as output side X2.

FIG. 2 is a sectional view of the speed reducer 10 relating to the embodiment (cut along a plane including the axis O1 shown in FIG. 1).

As shown in FIG. 2, in the speed reducer 10 relating to the present embodiment, an input shaft 3 including the input gear 30 is rotated to rotate a crankshaft 13. The speed reducer 10 is configured to oscillate and rotate oscillating gears 14 and 15 in conjunction with eccentric portions 13A and 13B of the crankshaft 13 by the rotation of the crankshaft 13. The speed reducer is configured to reduce the input rotation through the oscillatory rotations of the oscillating gears 14 and 15 and output the decelerated rotation.

The speed reducer 10 includes an outer tube 2, a shaft portion 4, the input shaft 3, a pair of bearings 5 (first bearing 5A and second bearing SB), a speed reducing portion 10A, and an attachment member 6. The outer tube 2 has a second receiving surface 2b and a third receiving surface 2c, which will be described below. The shaft portion 4 is rotatable inside the outer tube 2 and is fixedly provided on the output shaft 40. The shaft portion 4 has a shaft end surface 4b. The output shaft 40 is the portion connected to the first arm 120 of the industrial robot 100 of FIG. 1. The shaft portion 4 has a first receiving surface 4a, which will be described below. The input shaft 3 is also situated in the electric motor 31 (drive source, shown by the dotted line shown in FIG. 2). The axial runout of the pair of bearings 5 is equal to or less than 90 μm. The pair of bearings 5 rotatably support the outer tube 2 relative to the shaft portion 4. The first bearing 5A, which is one of the pair of bearings 5, is situated near the shaft end surface 4b in the axial direction. The second bearing SB, which is the other of the pair of bearings 5, is situated closer to the first bearing 5A than the shaft end surface 4b in the axial direction. In other words, the second bearing SB is a different bearing from the first bearing 5A. The speed reducing portion 10A is connected to the input shaft 3. The speed reducing portion 10A rotatably supports the shaft portion 4. The attachment member 6 has a flange 61. The flange 61 has a flange mounting surface 61a. The flange 61 can be attached to the electric motor 31. The flange 61 extends perpendicular to the axis of rotation of the shaft portion 4. The flange mounting surface 61a of the flange 61 is coupled to the outer tube 2 with first fixing bolts 62 (bolts).

The outer tube 2 forms the outer surface of the speed reducer 10. The external cylinder 2 has a cylindrical shape. Multiple pin grooves are formed in an inner peripheral surface 2a of the outer tube 2. The pin grooves each extend in the axial direction of the external cylinder 2. Each of the pin grooves 2b has a semicircular sectional shape when cut along a plane orthogonal to the axial direction. The pin grooves 2b are arranged at regular intervals in the circumferential direction along the inner peripheral surface 2a of the outer tube 2. The outer tube 2 forms a cylindrical internal space in which the crankshafts 13 and the first and second oscillating gears 14 and 15 are housed, when combined with the shaft portion 4.

The outer tube 2 has a plurality of internal tooth pins 21. Each of the internal tooth pins 21 is a substantially cylindrical member extending in the axial direction and placed in the corresponding pin groove. Specifically, the plurality of the internal tooth pins 21 are fitted into the corresponding pin grooves. In other words, the plurality of the internal tooth pins 21 are fitted into the pin grooves in a one-to-one correspondence. Each of the internal tooth pins 21 is oriented to extend in the axial direction of the outer tube 2. In this manner, the plurality of internal tooth pins 21 are arranged at regular intervals along the circumference of the outer tube 2. The internal tooth pins 21 mesh with external teeth of the first oscillating gear 14 and external teeth of the second oscillating gear 15.

The outer tube 2 has an input-side end surface. The input-side end surface of the outer tube 2 corresponds to a flange mounted surface. In the following description, the input-side end surface of the outer tube 2 is referred to as the flange-mounted surface 2d. The flange mounting surface 61a is attached to the flange mounted surface 2d. A plurality of female screw holes 22 are formed in the flange-mounted surface 2d. The first fixing bolts 62 for fixing the flange 61 of the attachment member 6 are fitted in the female screw holes 22, respectively. The screw axis of each of the plurality of female screw holes 22 extends parallel to the axis O1. The flange mounted surface 2d of the outer tube 2 resides in a plane perpendicular to the axis O1. With the flange 61 fixed to the outer tube 2, the flange mounted surface 2d is in surface contact with the flange mounting surface 61a of the flange 61.

The input shaft 3 serves as an input portion for receiving a driving force from the electric motor 31 (see FIG. 1). The shaft center of the input shaft 3 is different from the shaft center (axis O1) of the outer tube 2 and the shaft portion 4. The input shaft 3 is rotatable about the shaft center C. The input gear 30 is provided on the input shaft 3 on the outer circumferential surface of the front end thereof.

The shaft portion 4 is housed within the outer tube 2 while they are coaxially arranged. The shaft portion 4 is rotatable relative to the outer tube 2 about the same axis. More specifically, the shaft portion 4 is placed on the radially inner side of the external cylinder 2. In this state, the shaft portion 4 is supported by the pair of bearings 5A and SB, which are spaced away from each other in the axial direction. With this configuration, the shaft portion 4 is rotatable relative to the outer tube 2.

The shaft portion 4 has a shaft body 41, a plurality of (e.g., three) shafts 42, and an end plate 43 disposed on the input side X1 of the shafts 42.

The shaft body 41 is disposed inside the outer tube 2. The shaft body 41 is located near one end of the outer tube 2 in the axial direction. A circular central opening 41a is formed in the radially center of the shaft body 41. Around the central opening 41a, a plurality (e.g., two) of mounting holes are formed at equal intervals in the circumferential direction. The crankshaft 13 is disposed in each of the plurality of mounting holes. In the end surface of the shaft body 41 on the input side X1, a bolt hole 41b is formed into which a second fixing bolt 44 described below is engaged.

The end plate 43 is axially spaced apart from the shaft body 41. The end plate 43 is disposed inside the outer tube 2. The end plate 43 is disposed near the other end of the outer tube 2 in the axial direction. A through hole 43a is formed in the radial center of the end plate 43. Around the through hole 43a, a plurality (e.g., two) of crankshaft mounting holes are provided. The plurality of crankshaft mounting holes are provided at positions corresponding to the plurality of mounting holes in the shaft body 41. A closed space is formed in the outer tube 2. This closed space is surrounded by the inner surfaces of both the end plate 43 and the shaft body 41 facing each other and the inner circumferential surface 2a of the outer tube 2. The shaft body 41 has an output-side end surface. The output-side end surface of the shaft body 41 corresponds to the shaft end surface. In the following description, the output-side end surface of the shaft body 41 is referred to as the shaft end surface 4b. The shaft end surface 4b is formed in a plane perpendicular to the axis O1.

The three shafts 42 are formed integrally with the shaft body 41. The three shafts 42 extend linearly from one main surface (inner surface) of the shaft body 41 toward the end plate 43. The three shafts 42 are arranged at equal intervals in the circumferential direction. Each of the three shafts 42 is fastened to the shaft body 41 by the second fixing bolt 44. In this way, the shaft body 41, shafts 42, and end plate portion 43 are integrated to form a single unit.

The speed reducing portion 10A has the plurality (e.g., two) of crankshafts 13 rotatably supported by the shaft portion 4, the first oscillating gear 14, and the second oscillating gear 15 as described above. The first and second oscillating gears 14 and 15 surround the crankshafts 13.

The pair of bearings 5 includes the first bearing 5A disposed on the output side X2 and the second bearing SB disposed on the input side X1. Each of the first bearing 5A and the second bearing SB has an inner ring 51 and an outer ring 52. The inner ring of the first bearing 5A corresponds to a first inner ring. The outer ring of the first bearing 5A corresponds to a first outer ring. The inner ring of the second bearing SB corresponds to a second inner ring. The outer ring of the second bearing SB corresponds to a second outer ring. The inner ring 51 of the first bearing 5A is held by the shaft body 41 of the shaft portion 4. In the axial direction, the first receiving surface 4a of the shaft portion 4 contacts an output-side end surface 51a of the inner ring 51 of the first bearing 5A. In the axial direction, the second receiving surface 2b of the outer tube 2 contacts an input-side end surface 52a of the outer ring 52 of the first bearing 5A. In the axial direction, the third receiving surface 2c of the outer tube 2 contacts an output-side end surface 52b of the outer ring 52 of the second bearing SB.

The attachment member 6 is fixed to the flange mounted surface 2d on the input side X1 of the outer tube 2 with the first fixing bolt 62 such that it covers the speed reducer 10A from the input side X1. The attachment member 6 has a disk portion 63, a cylindrical portion 64, and a flange 61. The cylindrical portion 64 extends from the outer periphery of the disk portion 63 toward the output side X2. The flange 61 extends radially outward from a part of the circumference of the cylindrical portion 64. The disk portion 63, the cylindrical portion 64, and the flange 61 form the attachment member 6 that has a top-closed cylindrical shape. The disk portion 63 has an opening 63a formed in the center of the disk portion 63. The disk 63 has a plurality of retaining holes 63b formed around the opening 63a. The plurality of retaining holes 63b are provided for retaining the input gear 30.

The flange 61 is provided on the entire circumference of the cylindrical portion 64. The flange 61 has a plurality of through holes 61b. The plurality of through holes 61b are formed at predetermined intervals in the circumferential direction of the flange 61. The first fixing bolt 62 is inserted into each of the plurality of through holes 61b from the input side X1. The plurality of through holes 61b are arranged at the positions corresponding to the positions of the plurality of female screw holes 22 formed in the flange mounted surface 2d of the outer tube 2.

Figure 3:
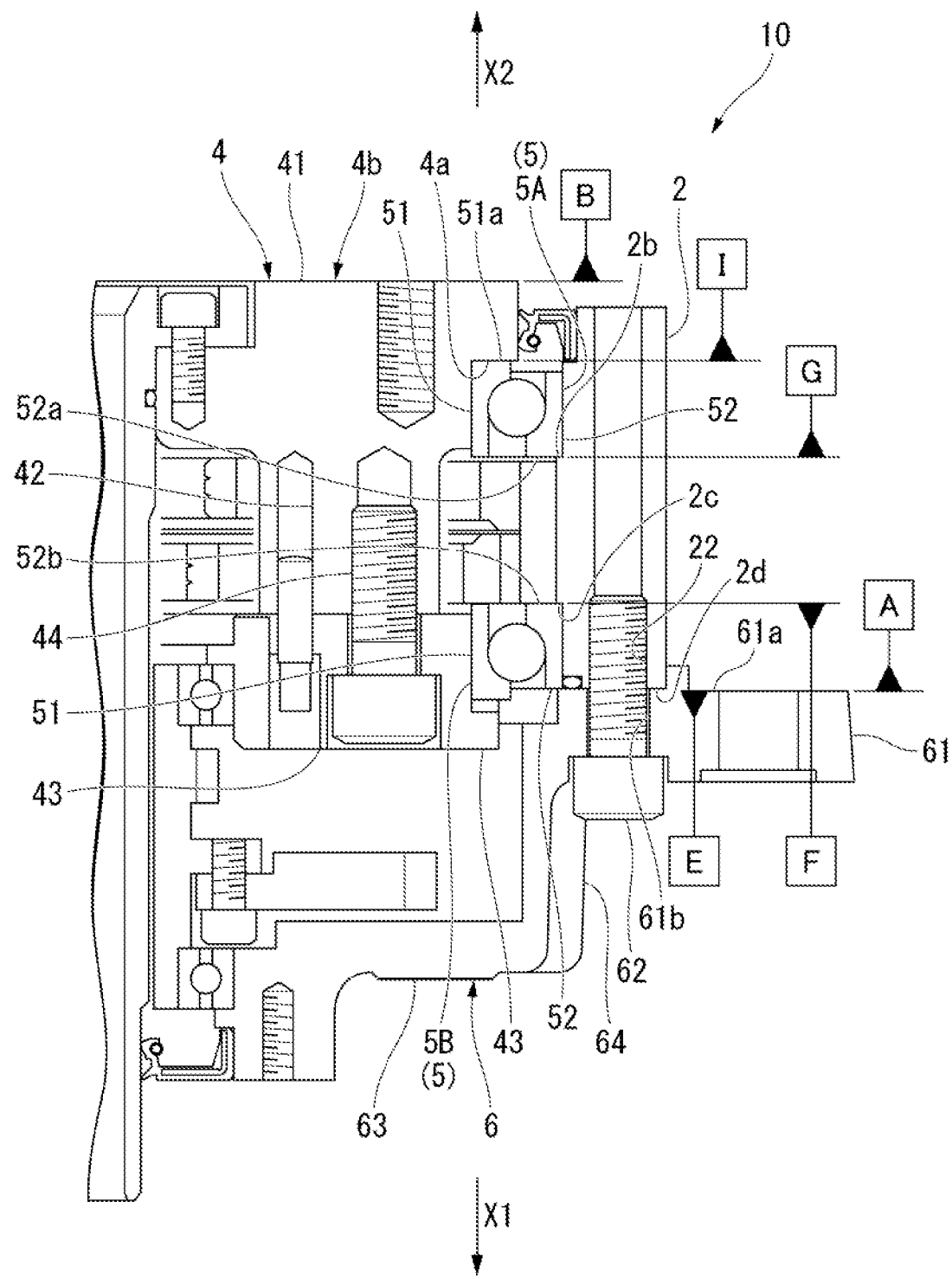
FIG. 3 is an enlarged view of a part of the speed reducer of FIG. 2, illustrating a manufacturing method of the speed reducer.

A manufacturing method of the above speed reducer 10 will now be described in detail with reference to FIG. 3. FIG. 3 is an enlarged view of the speed reducer 10 of FIG. 2 including its essential portions. FIG. 3 is for illustrating the method of manufacturing the speed reducer 10. The manufacturing method of the speed reducer 10 described here relates to the accuracy of each of the components constituting the speed reducer 10. Here, "accuracy" means the assembly accuracy in assembling the plurality of components and the machining accuracy obtained by machining each of the plurality of components. In the manufacturing method of the speed reducer 10 according to the embodiment, five manufacturing methods (first to fifth manufacturing methods) are implemented. In the following embodiment, the first manufacturing method hereunder described is the essential manufacturing method, and the second to fifth manufacturing methods can be employed in combination with the first manufacturing method as appropriate.

[First Manufacturing Method]

As shown in FIG. 3, the first receiving surface 4a (first accuracy-required surface indicated by "I") of the shaft portion 4 contacts the inner ring 51 of the first bearing 5A in the axial direction. A first machining accuracy is calculated based on a first parallelism between the first receiving surface 4a of the shaft portion 4 and the shaft end surface 4b (second accuracy-required surface indicated by "B") of the shaft portion 4. In other words, the first parallelism is obtained by machining the first receiving surface 4a and the shaft end surface 4b, and the first machining accuracy is obtained based on the first parallelism. As shown in FIG. 3, the second receiving surface 2b (fourth accuracy-required surface indicated by "G") of the outer tube 2 contacts the outer ring 52 of the first bearing 5A in the axial direction. A second machining accuracy is calculated based on a second parallelism between the second receiving surface 2b of the outer tube 2 and the flange mounting surface 61a (third accuracy-requiring surface indicated by "A") of the flange 61 of the attachment member 6. In other words, the second parallelism is obtained by machining the second receiving surface 2b and the flange mounting surface 61a, and the second machining accuracy is obtained based on the second parallelism. In the first manufacturing method, machining is performed such that the first machining accuracy becomes higher than the second machining accuracy.

[Second Manufacturing Method]

In the second manufacturing method, machining is performed such that the first parallelism of the first machining accuracy (i.e., the parallelism between the first accuracy-required surface I and the second accuracy-required surface B) described above is 10 μm or less, regardless of the rotation phase between the shaft portion 4 and the outer tube 2.

Figure 4:
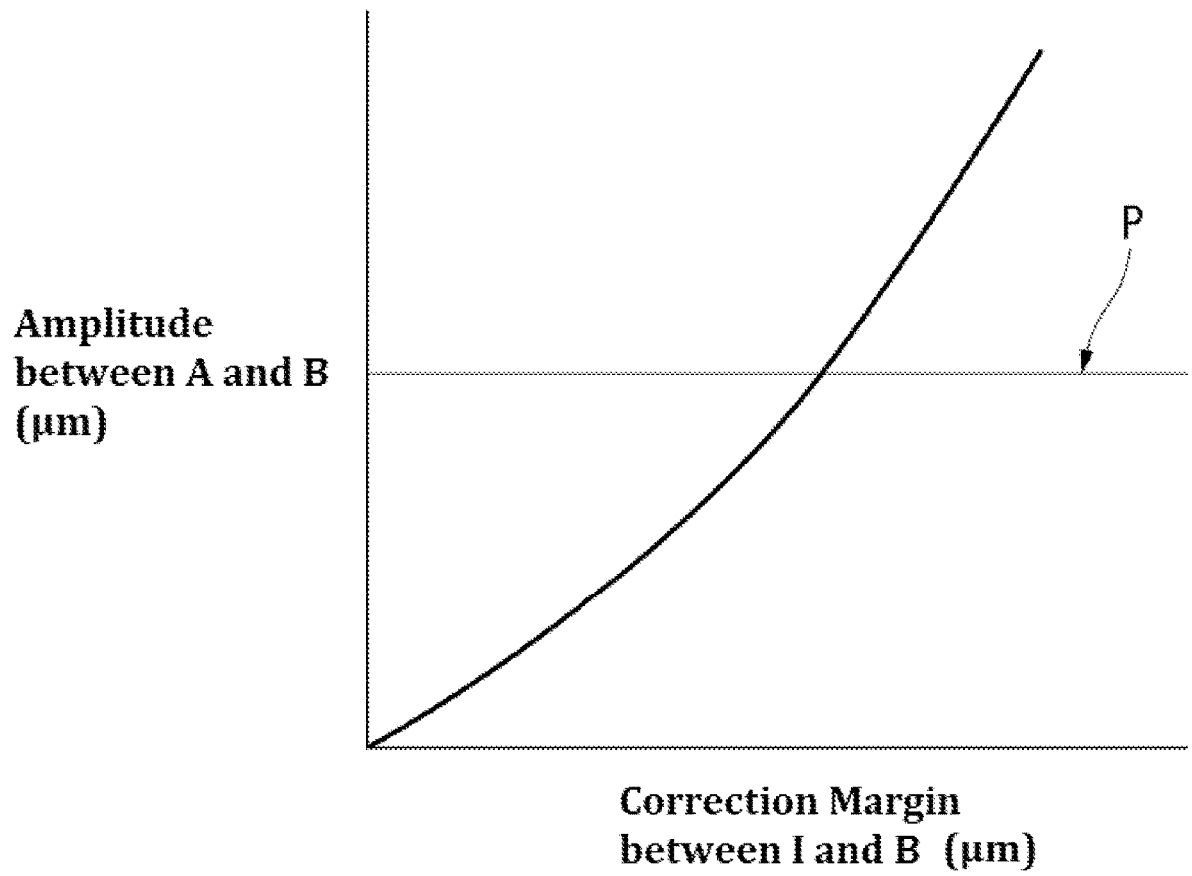
FIG. 4 illustrates a relationship between a correction margin between I and B and an amplitude between A and B.

FIG. 4 shows the relationship between a correction margin (μm), which is the parallelism between the first accuracy-required surface I and the second accuracy-required surface B, and the amplitude (μm) between the third accuracy-required surface A and the second accuracy-required surface B. As shown in FIG. 4, it can be seen that the amplitude between A and B (runout of the shaft portion 4) can be adjusted only by adjusting the correction margin between the surfaces I and B. The line P in FIG. 4 indicates the reference value (10 μm) of the amplitude between the surfaces A and B. For example, if the parallelism between the surfaces I and B exceeds the standard value, it can be corrected and adjusted by finding, from the graph of FIG. 4, a correction margin that realizes a parallelism between the surfaces I and B of less than the standard value (10 μm).

[Third Manufacturing Method]

In the third manufacturing method, machining is performed such that a third parallelism between the flange mounting surface 61a of the attachment member 6 (third accuracy-required surface A) and the flange mounted surface 2d (fifth accuracy-required surface indicated by "E") of the outer tube 2 becomes 20 μm or less.

[Fourth Manufacturing Method]

In the fourth manufacturing method, the second receiving surface 2b (fourth accuracy-required surface indicated by "G") of the outer tube 2, the third receiving surface 2c (sixth accuracy-required surface indicated by "F") of the outer tube 2, and the flange-mounted surface 2d (fifth accuracy-required surface E) of the outer tube 2 are each machined to have a parallelism of 30 μm or less.

[Fifth Manufacturing Method]

In the fifth manufacturing method, machining is performed such that the second parallelism of the second machining accuracy (i.e., parallelism between the third accuracy-required surface A and the fourth accuracy-required surface G) described above becomes 170 μm or less.

Here, when a bolt(s) is used to secure the shaft to the end plate 43 from the output side X2 (shaft end surface 4b side) of the shaft body 41, the bolt is subjected to a load generated by a squeeze margin when the pair of bearings 5A and SB are assembled. To address this in this embodiment, the second fixing bolt 44 that secures the shaft portion 4 and the bearings 5 does not apply a fastening force to the output side X2 (shaft end surface 4b side) of the shaft portion 4. The second fixing bolt 44 is inserted from the input side X1 of the end plate 43 of the shaft portion 4 into the bolt hole 41b formed in the shaft body 41. The second fixing bolt 44 is not screwed into the shaft end surface 4b, which is the second accuracy-required surface B. This prevents the influence of the load generated by the squeeze margin described above.

The above embodiment has described the method of manufacturing the speed reducer 10. The speed reducer includes: the outer tube 2; the shaft portion 4 rotatably provided inside the outer tube 2, the shaft portion 4 being fixedly coupled to an output shaft and having a shaft end surface 4b; the input shaft 3 coupled to the electric motor 31; the pair of bearings 5 rotatably supporting the outer tube 2 relative to the shaft portion 4, the pair of bearings 5 including a first bearing 5A provided near the shaft end surface 4b and a second bearing SB provided closer to the first bearing 5A rather than the shaft end surface 4b; the speed reducing portion 10A connected with the input shaft 3 and rotatably supporting the shaft portion 4; and the attachment member 6 having a flange 61, the flange 61 having a flange mounting surface 61a fastened to the outer tube 2 by the first fixing bolt 62, the flange 61 extending perpendicular to the rotational axis of the shaft portion 4 and being attachable to the electric motor 31. The shaft portion 4 has the first receiving surface 4a. The outer tube 2 has the second receiving surface 2b. The first bearing 5A has the first inner ring 51 and the first outer ring 52. The first receiving surface 4a contacts the first inner ring 51 in the axis direction. The second receiving surface 2b contacts the first outer ring 52 in the axis direction. The first machining accuracy is obtained based on the first parallelism between the first receiving surface 4a and the shaft end surface 4b. The second machining accuracy is obtained based on the second parallelism between the second receiving surface 2b and the flange mounting surface 61a. In the manufacturing method, machining is performed such that the first machining accuracy becomes higher than the second machining accuracy. In the method of manufacturing the speed reducer 10 related to the embodiment, only the first machining accuracy based on the first parallelism between the first receiving surface 4a (first accuracy-required surface I) of the shaft portion 4 and the shaft end surface 4b (second accuracy-required surface B) of the shaft portion 4 can be adjusted at the final step of the manufacturing method. By adjusting the first machining accuracy, it is possible to produce the speed reducer 10 that can minimize the runout of the shaft portion 4, i.e., the runout of the output shaft. As described above, in the embodiment, the method can manufacture the speed reducer 10 with high accuracy by the simple adjustment work in the manufacturing process. Therefore, the manufacturing cost can be reduced. In other words, it is possible to manufacture precision reducers (RVs) for which runout adjustment is unnecessary or can be minimized.

In addition, in the embodiment, machining is performed such that the first parallelism of the first machining accuracy becomes 10 μm or less, regardless of a rotation phase between the shaft portion 4 and the outer tube 2. Accordingly, the runout of the shaft portion 4 can be more reliably minimized, and the speed reducer 10 can be manufactured with high precision and at low cost.

In the manufacturing method of the speed reducer 10, the axial runout of the bearing 5 is less than 90 μm. Thus, the runout of the shaft portion 4 can be more reliably minimized, and the speed reducer 10 can be manufactured with high precision and at low cost.

Furthermore, in the embodiment, the outer tube 2 has the flange-mounted surface 2d. The flange mounted surface 2a is coupled to the flange mounting surface 61a of the attachment member 6. Machining is performed such that the third parallelism between the flange mounting surface 61a of the attachment member 6 and the flange mounted surface 2d of the outer tube 2 becomes 20 μm or less. Accordingly, the runout of the shaft portion 4 can be more reliably minimized, and the speed reducer 10 can be manufactured with high precision and at low cost.

The second bearing SB has the second inner ring 51 and the second outer ring 52. The outer tube 2 has the third receiving surface 2c and the flange mounted surface 2d. The third receiving surface 2c contacts the second outer ring 52 in the axis direction. The flange mounting surface 61a is coupled to the flange mounted surface 2d. Machining is performed such that the parallelism between each of the second receiving surface 2b, the third receiving surface 2c of the outer tube 2, and the flange mounted surface 2d of the outer tube 2 becomes 30 μm or less. Accordingly, the runout of the shaft portion 4 can be more reliably minimized, and the speed reducer 10 can be manufactured with high precision and at low cost.

Moreover, in the embodiment, machining is performed such that the second parallelism of the second machining accuracy becomes 170 μm or less. Accordingly, the runout of the shaft portion 4 can be more reliably minimized, and the speed reducer 10 can be manufactured with high precision and at low cost.

The speed reducer 10 related to the embodiment includes: the outer tube 2; the shaft portion 4 rotatably provided inside the outer tube 2, the shaft portion 4 being fixedly coupled to an output shaft and having a shaft end surface 4b; the input shaft 3 coupled to the electric motor 31; the pair of bearings 5 rotatably supporting the outer tube 2 relative to the shaft portion 4, the pair of bearings 5 including a first bearing 5A provided near the shaft end surface 4b and a second bearing SB provided closer to the first bearing 5A rather than the shaft end surface 4b; the speed reducing portion 10A connected with the input shaft 3 and rotatably supporting the shaft portion 4; and the attachment member 6 having a flange 61. The flange 61 has a flange mounting surface 61a fastened to the outer tube 2 by the first fixing bolt 62. The flange 61 extends perpendicular to the rotational axis of the shaft portion 4. The flange 61 is attachable to the electric motor 31. The shaft portion 4 has the first receiving surface 4a. The outer tube 2 has the second receiving surface 2b. The first bearing 5A has the first inner ring 51 and the first outer ring 52. The first receiving surface 4a contacts the first inner ring 51 in the axis direction. The second receiving surface 2b contacts the first outer ring 52 in the axis direction. The first machining accuracy is obtained based on the first parallelism between the first receiving surface 4a and the shaft end surface 4b. The second machining accuracy is obtained based on the second parallelism between the second receiving surface 2b and the flange mounting surface 61a. The speed reducer is configured such that the first machining accuracy is higher than the second machining accuracy. In the speed reducer 10 related to the embodiment, only the first machining accuracy based on the first parallelism between the first receiving surface 4a (first accuracy-required surface I) of the shaft portion 4 and the shaft end surface 4b (second accuracy-required surface B) of the shaft portion 4 can be adjusted at the final step of the manufacturing method. By adjusting the first machining accuracy, it is possible to produce the speed reducer 10 that can minimize the runout of the shaft portion 4, i.e., the runout of the output shaft. As described above, in the embodiment, the speed reducer 10 with high accuracy can be manufactured by the simple adjustment work in the manufacturing process. Therefore, the manufacturing cost can be reduced. In other words, it is possible to manufacture precision reducers (RVs) for which runout adjustment is unnecessary or can be minimized.

The industrial robot 100 related to embodiment includes the base 110, the first arm 120 with the working head 140, the electric motor provided in the base 110 for providing a driving force to rotate the first arm 120, and the speed reducer 10 for reducing the speed of the rotation of the electric motor 31. The speed reducer 10 includes: the outer tube 2; the shaft portion 4 rotatably provided inside the outer tube 2, the shaft portion 4 being fixedly coupled to an output shaft and having a shaft end surface 4b; the input shaft 3 coupled to the electric motor 31; the pair of bearings 5 rotatably supporting the outer tube 2 relative to the shaft portion 4, the pair of bearings 5 including a first bearing 5A provided near the shaft end surface 4b and a second bearing SB provided closer to the first bearing 5A rather than the shaft end surface 4b; the speed reducing portion 10A connected with the input shaft 3 and rotatably supporting the shaft portion 4; and the attachment member 6 having a flange 61, the flange 61 having a flange mounting surface 61a fastened to the outer tube 2 by the first fixing bolt 62, the flange 61 extending perpendicular to the rotational axis of the shaft portion 4 and being attachable to the electric motor 31. The shaft portion 4 has the first receiving surface 4a. The outer tube 2 has the second receiving surface 2b. The first bearing 5A has the first inner ring 51 and the first outer ring 52. The first receiving surface 4a contacts the first inner ring 51 in the axis direction. The second receiving surface 2b contacts the first outer ring 52 in the axis direction. The first machining accuracy is obtained based on the first parallelism between the first receiving surface 4a and the shaft end surface 4b. The second machining accuracy is obtained based on the second parallelism between the second receiving surface 2b and the flange mounting surface 61a. The speed reducer is configured such that the first machining accuracy is higher than the second machining accuracy.

In the industrial robot 100 related to the embodiment, only the first machining accuracy based on the first parallelism between the first receiving surface 4a (first accuracy-required surface I) of the shaft portion 4 and the shaft end surface 4b (second accuracy-required surface B) of the shaft portion 4 can be adjusted at the final step of the manufacturing method. By adjusting the first machining accuracy, it is possible to produce the speed reducer 10 that can minimize the runout of the shaft portion 4, i.e., the runout of the output shaft. This speed reducer 10 can be used for the industrial robot 100. As described above, in the embodiment, the speed reducer 10 with high accuracy can be manufactured by the simple adjustment work in the manufacturing process. Therefore, the manufacturing cost can be reduced. In other words, it is possible to manufacture precision reducers (RVs) for which runout adjustment is unnecessary or can be minimized.

As described above, the speed reducer 10 with high accuracy related to the embodiment can be manufactured by the simple adjustment work in the manufacturing process. Therefore, the manufacturing cost can be reduced.

The present invention is not limited to the above-described embodiments, and the embodiments can be modified in a variety of designs without deviating from the spirit of the present invention.

For example, the above embodiments described how to implement the first to fifth manufacturing methods in the manufacturing of the speed reducer 10. As mentioned above, only the first manufacturing method is the essential manufacturing method, and the second to fifth manufacturing methods can be employed in combination with the first manufacturing method as appropriate.

In the embodiments disclosed herein, a member formed of multiple components may be integrated into a single component, or conversely, a member formed of a single component may be divided into multiple components. Irrespective of whether or not the components are integrated, they are acceptable as long as they are configured to attain the object of the invention.

In the foregoing embodiments, the speed reducer 10 is applied to the industrial robot 100, but the present invention is not limited to such. As an alternative example, the speed reducer of the present invention can be applied to construction machines and automobiles.

What is claimed is:

1. A method of manufacturing a speed reducer, wherein the speed reducer includes:
    an outer tube;
    a shaft portion rotatably provided inside the outer tube, the shaft portion being fixedly coupled to an output shaft and having a shaft end surface;
    an input shaft coupled to a drive source;
    a pair of bearings rotatably supporting the outer tube relative to the shaft portion, the pair of bearings including a first bearing provided near the shaft end surface and a second bearing different from the first bearing;
    a speed reducing portion connected with the input shaft and rotatably supporting the shaft portion; and
    an attachment member having a flange, the flange having a flange mounting surface fastened to the outer tube by a bolt, the flange extending perpendicular to a rotational axis of the shaft portion and being attachable to the drive source,
    wherein the shaft portion has a first receiving surface,
    wherein the outer tube has a second receiving surface,
    wherein the first bearing has a first inner ring and a first outer ring,
    wherein the first receiving surface contacts the first inner ring in a direction of the rotational axis,
    wherein the second receiving surface contacts the first outer ring in the rotational axis direction,
    wherein a first machining accuracy is obtained based on a first parallelism between the first receiving surface and the shaft end surface, and
    wherein a second machining accuracy is obtained based on a second parallelism between the second receiving surface and the flange mounting surface,
    the manufacturing method comprising performing machining such that the first machining accuracy becomes higher than the second machining accuracy.

2. The manufacturing method of claim 1, wherein machining is performed such that the first parallelism of the first machining accuracy becomes 10 μm or less, regardless of a rotation phase between the shaft portion and the outer tube.

3. The manufacturing method of claim 1, wherein an axial runout of the pair of bearings is equal to or less than 90 μm.

4. The manufacturing method of claim 1, wherein the outer tube has a flange mounted surface,
    wherein the flange mounting surface is attached to the flange mounted surface, and
    the method further comprising performing machining a third parallelism between the flange mounting surface and the flange mounted surface becomes 20 μm or less.

5. The manufacturing method of claim 1, wherein the second bearing has a second inner ring and a second outer ring,
    wherein the outer tube has a third receiving surface and a flange mounted surface,
    wherein the third receiving surface contacts the second outer ring in the rotational axis direction, and
    wherein the flange mounting surface is attached to the flange mounted surface,
    the method further comprising performing machining such that a parallelism between each of the second receiving surface, the third receiving surface, and the flange mounted surface is 30 μm or less.

6. The manufacturing method of claim 1, further comprising performing machining such that the second parallelism of the second machining accuracy becomes 170 μm or less.

7. The manufacturing method of claim 1, wherein an axial runout of the pair of bearings is equal to or less than 90 μm,
    wherein the outer tube has a third receiving surface and a flange mounted surface,
    wherein the flange mounting surface is attached to the flange mounted surface,
    wherein the second bearing has a second inner ring and a second outer ring,
    wherein the third receiving surface contacts the second outer ring in the rotational axis direction, and
    wherein the method further comprises:
        performing machining such that the first parallelism of the first machining accuracy becomes 10 μm or less, regardless of a rotation phase between the shaft portion and the outer tube;
        performing machining such that a third parallelism between the flange mounting surface and the flange mounted surface becomes 20 μm or less;
        performing machining such that a parallelism between each of the second receiving surface, the third receiving surface, and the flange mounted surface becomes 30 μm or less; and
        performing machining such that the second parallelism of the second machining accuracy becomes 170 μm or less.

8. A speed reducer comprising:
an outer tube;
a shaft portion rotatably provided inside the outer tube, the shaft portion being fixedly coupled to an output shaft and having a shaft end surface;
an input shaft coupled to a drive source;
a pair of bearings rotatably supporting the outer tube relative to the shaft portion, the pair of bearings including a first bearing provided near the shaft end surface and a second bearing different from the first bearing;
a speed reducing portion connected with the input shaft and rotatably supporting the shaft portion; and
an attachment member having a flange, the flange having a flange mounting surface fastened to the outer tube by a bolt, the flange extending perpendicular to a rotational axis of the shaft portion and being attachable to the drive source,
wherein the shaft portion has a first receiving surface,
wherein the outer tube has a second receiving surface,
wherein the first bearing has a first inner ring and a first outer ring,
wherein the first receiving surface contacts the first inner ring in a direction of the rotational axis,
wherein the second receiving surface contacts the first outer ring in the rotational axis direction,
wherein a first machining accuracy is obtained based on a first parallelism between the first receiving surface and the shaft end surface,
wherein a second machining accuracy is obtained based on a second parallelism between the second receiving surface and the flange mounting surface, and
wherein the first machining accuracy is higher than the second machining accuracy.

9. A rotating device comprising:
a device body;
a rotated body with a working head;
an electric motor provided on the device body, the motor being configured to produce a driving force to rotate the rotated body; and
a speed reducer for reducing speed of rotation of the electric motor,
wherein the speed reducer includes:
an outer tube;
a shaft portion rotatably provided inside the outer tube, the shaft portion being fixedly coupled to an output shaft and having a shaft end surface;
an input shaft coupled to a drive source;
a pair of bearings rotatably supporting the outer tube relative to the shaft portion, the pair of bearings including a first bearing provided near the shaft end surface and a second bearing different from the first bearing;
a speed reducing portion connected with the input shaft and rotatably supporting the shaft portion; and
an attachment member having a flange, the flange having a flange mounting surface fastened to the outer tube by a bolt, the flange extending perpendicular to a rotational axis of the shaft portion and being attachable to the drive source,
wherein the shaft portion has a first receiving surface,
wherein the outer tube has a second receiving surface,
wherein the first bearing has a first inner ring and a first outer ring,
wherein the first receiving surface contacts the first inner ring in a direction of the rotational axis,
wherein the second receiving surface contacts the first outer ring in the rotational axis direction,
wherein a first machining accuracy is obtained based on a first parallelism between the first receiving surface and the shaft end surface,
wherein a second machining accuracy is obtained based on a second parallelism between the second receiving surface and the flange mounting surface, and
wherein the first machining accuracy is higher than the second machining accuracy.

\* \* \* \* \*